United States Patent Office 3,767,637
Patented Oct. 23, 1973

3,767,637
PROCESS OF PRODUCING POLYVINYL
CHLORIDE-CONTAINING POLYMERS
Rolf Egli, Sins, Switzerland, assignor to
Lonza Ltd., Basel, Switzerland
No Drawing. Filed Oct. 15, 1971, Ser. No. 189,776
Claims priority, application Switzerland, Oct. 20, 1970,
15,434/70
Int. Cl. C08f 3/22
U.S. Cl. 260—92.8 W                                 5 Claims

ABSTRACT OF THE DISCLOSURE

Process of producing polyvinyl chloride-containing polymers of porous grain structure, wherein vinyl chloride monomer or vinyl chloride monomer in admixture with other ethylenically unsaturated monomers is suspension polymerized in the presence of an emulsifier. In accordance with the invention, the emulsifier is of organophilic nature and is a metal salt of a fatty alcohol polyglycol ether carboxylic acid of the formula Me—[OOCCH$_2$O(CH$_2$CH$_2$O)$_x$(CH$_2$)$_n$CH$_3$]$_m$ wherein Me is at least one of the metals Mg, Ca, Ba, Cd, Zn, Al, Pb or Sn; $m$, in dependence on the valence of the metal, stands for 2, 3 or 4; $x$ is a number of from 0 to 20 and $n$ is a number of from 6 to 20.

FIELD OF INVENTION

The invention is concerned with a process for the production of polyvinyl chloride of porous grain structure according to the suspension polymerization procedure.

The term "polyvinyl chloride" as used herein, includes not only homopolymers of vinyl chloride but also mixed polymers formed by the suspension polymerization of vinyl chloride monomer with other ethylenically unsaturated monomers.

BACKGROUND INFORMATION AND PRIOR ART

It is well known that polyvinyl chloride with grains or particles of porous structure is suitable for the production of dry flowable mixtures which can be easily poured. The softener or plasticizer is in such instances accepted by the polyvinyl chloride by simple admixture.

Pursuant to the prior art procedures for the production of such porous polyvinyl chlorides, auxiliary substances are added to the polymerization system. Thus, British patent 796,309 proposes a procedure in which the aqueous phase of the polymerization system is admixed with methylcellulose as suspension stabilizer as well as with 0.02 to 0.15 part of an anionic emulsifier which may be sodium laurylsulfate. Further, the suspension polymerization system contains 0.02 to 0.15 part of a water soluble salt of a multivalent metal, such as for example, barium chloride.

U.S. Pat. 2,772,257 discloses a suspension polymerization system wherein a mixed polymer of vinyl acetate and maleic acid anhydride in a ratio of 1:1 is used as principal stabilizer while an ethylene oxide addition product to a partial fatty acid ester of a multivalent alcohol is used as auxiliary additive. As synergistic agent to the auxiliary additive the system moreover contains a monofatty acid ester of glycerine, ethyleneglycol or diethyleneglycol.

In respect to the first mentioned prior art procedure of the British patent, the presence of the electrolyte in the formed polymer is of considerable disadvantage in respect to its thermostability and electrical properties. Concerning the second procedure of the U.S. patent referred to, the principal disadvantage is that the softener-containing masses during the polymerization have a tendency to adhere to metal surfaces of the apparatus and to form crusts thereon which can be removed with difficulty only.

The most pertinent prior art known to applicant consists of Swiss Pats. 347,355 and 416,117 as well as U.S. Pats. 3,432,455 and 3,120,505. The two Swiss and two U.S. patents were found by the Institut International des Brevets of The Hague, Netherlands, as the result of a search conducted by the Institut upon instructions of applicant.

SUMMARY OF THE INVENTION

It is a primary object of the invention to overcome the disadvantages and drawbacks of the prior art suspension polymerization procedures and to propose a suspension polymerization procedure which results in polyvinyl chloride of excellent quality and characteristics.

It is also an object of the invention generally to improve on suspension polymerization procedures for the production of polyvinyl chloride as presently practiced.

Briefly and in accordance with the invention, the above objects are superiorly attained by performing the suspension polymerization in the presence of an organophilic emulsifier of the general formula Me—[OOCCH$_2$O(CH$_2$CH$_2$O)$_x$(CH$_2$)$_n$CH$_3$]$_m$ wherein Me is one of the metals magnesium, calcium, barium, cadmium, zinc, aluminum, lead or tin;
$m$, dependent on the valence of the respective metal, stands for 2, 3 or 4;
$x$ is a number of from 0 to 20; and
$n$ is a number of between 6 and 20.

The organophilic emulsifier is thus a water-insoluble salt of a fatty alcohol polyglycol ether carboxylic acid. The metal component or moiety of the emulsifier may be composed of two or several different metals.

The fatty alcohol polyglycol ether carboxylic acid may be prepared according to well known methods.

The organophilic emulsifier may be added in prepared form to the polymerization system or the emulsifier may be prepared in situ in the reaction vessel in which the polymerization is carried out, either during the polymerization proper or before the polymerization is initiated. The preparation of the emulsifier in the latter case is effected by reacting an alkali metal salt or ammonium salt of the fatty alcohol polyglycol ether carboxylic acid with a water-soluble salt of the metal component. Thus, the chlorides, sulfates or nitrates of the respective metals are suitable for the indicated purpose. The metal chlorides are preferred.

Dependent on the valence of the respective metal, two or more fatty alcohol polyglycol ether carboxylic acids are bonded per atom of metal. Accordingly it is possible to use emulsifiers in which the structure is symmetrical or unsymmetrical, dependent on whether a single or several different fatty alcohol polyglycol ether carboxylic acids are used.

In accordance with the invention and provided that several different fatty alcohol polyglycol ether carboxylic acids are bonded to metal, the former may differ in respect to the carbon chain length of the fatty alcohol moiety and/or the polyglycol ether groups.

The porosity of the polymers obtained as the result of the inventive procedure acn be readily controlled by the amount of organophilic emulsifier in the system. The specific amount to be employed will be dependent on the desired degree of porosity. Generally and preferably 0.01‰ to 1% of emulsifier, calculated on the amount of monomers in the system, give excellent results.

The organophilic emulsifier of the invention does not only increase the porosity of the final polymer product but also exerts a stabilizing effect in the final product. For this reason it is possible to decrease the amount of stabilizer in the final polymer product.

The inventive emulsifier is suitable not only for the production of porous homopolymers of vinyl chloride but can also successfully be used in the suspension polymerization of vinyl chloride monomer with other ethylenically unsaturated monomers to yield a polyvinyl chloride-containing mixed polymer. Such other monomers are, for example, other vinyl halides, such as vinylidenechloride, vinyl ester, such as vinyl acetate, vinyl propionate, vinyl ether, acrylic- and methacrylic compounds, maleic acid ester and the like. However, it has been found that the amount of non-vinyl chloride monomers should advantageously not exceed 80% of the total monomeric amount.

The polymerization with the inventive emulsifier may be carried out according to the customary suspension polymerization procedure. Water-soluble cellulose esters are suitably used as protective colloids, while the activators may be of the known oil-soluble types.

The organophilic emulsifier of the invention may be added to the system, either prior or during the admixture of the monomer or monomers. If the organophilic emulsifier is formed in situ, as previously mentioned, the final polymer has to be washed to remove electrolyte.

It will be appreciated that the organophilic emulsifier of the invention may be mixed with prior art conventional emulsifiers, such as fatty acids and their salts, and such mixtures may be successfully used in a suspension polymerization system.

The invention will now be described by several examples, it being understood that these examples are given by way of illustration and not by way of limitation, and that many changes may be effected without affecting in any way the scope and spirit of the invention as recited in the appended claims.

Example 1

A pressure vessel made from stainless steel V$_2$A and having a volume capacity of 9.6 liters was charged with:

5900 parts of desalted water;
10 parts of an aqueous solution of the ammonium salt of a stearyl alcohol polyglycol ether carboxylic acid containing 2 polyglycol ether units ($x=2$, $n=16$) of 10% concentration;
1 part of 13 n. ammonia;
120 parts of a protective colloid solution (cellulose ether) of 2% concentration; and
2.8 parts of a dialkyl peroxydicarbonate initiator.

The charge in the pressure vessel was heated to 40° C. Oxygen was removed from the pressure vessel by repeated evacuation and flushing with VC-gas. 2800 parts of vinyl chloride were then added to the pressure vessel and 1 part of MgCl$_2$·6H$_2$O in solution was added. The mixture thus obtained was heated to 53° C. The pressure vessel or autoclave space was maintained in filled condition by means of pressurized water until a conversion of about 10 to 15% had been attained. Cooling was effected at the end of the reaction, which was signaled by decreasing pressure, whereupon the resin was washed in a centrifuge until it was free of chloride. For this purpose, the wash water was subjected to the chlorine test. The resin or polymer was finally dried. The granular product obtained was subjected to analysis giving the following results:

Sieve-analysis (the percentage values indicate the amount of material which did not pass through the respective sieves):

0% on 0.30-mm. sieve
15% on 0.20-mm. sieve
32% on 0.15-mm. sieve
67% on 0.10-mm. sieve
98% on 0.06-mm. sieve Pouring or bulk density: 0.39 g./ml.

Fish eyes in rough sheet (65% PVC, 35% DOP, rolled at 150° C. after:

3 minutes of rolling: 15
6 minutes of rolling: 8
9 minutes of rolling: 2
12 minutes of rolling: 0

Thermostability (rolled at 170° C. together with stabilizer for 10 to 20 minutes).

Transmission of the compressed rough sheet at 400 nm.

| | Percent |
|---|---|
| 10-minute sample | 73 |
| 20-minute sample | 71 |
| Porosity open | 28 |
| Porosity closed | 0 |

Specific electric resistance of a hose in water at 50° C. (SEVO 184.1950): 730.10$^3$ megohm.cm.

For control purposes the procedure of Example 1 was repeated and effected in identical manner, however in the absence of the emulsifier-magnesium salt. With essentially the same granule size, a pouring or bulk density of 0.61 g./ml. was obtained. The number of fish eyes in all rough sheets remained above 100. The thermostability and electric resistance values were about the same, but the open porosity was only 17%.

Example 2

In modification of Example 1, the polyglycol ether chain in the emulsifier was changed and stearyl alcohol was replaced by lauryl alcohol. Otherwise, this example corresponds to the procedure of Example 1. The number of glycol ether units $x$ was thus raised to 12. The granule size of the final product was similar to that of Example 1 and a porosity-increasing effect was observed which is expressed in the low number of fish eyes.

Examples 3 and 4

These examples were carried out as in Example 1, but the emulsifier was formed from lauryl alcohol polyglycol ether carboxylic acid with 2 (Example 3) and 4 (Example 4) glycol ether units. The same granule formation as in Example 1 was obtained, and the bulk densities in Examples 3 and 4 were 0.40 g./ml. while the same low number of fish eyes as in Example 1 was counted.

Examples 5 and 6

As previously stated, not only magnesium salts but also salts of other multivalent metals, such as, for example, calcium and barium, are suitable for the inventive purposes.

Example 5 was a repetition of Example 1, but the magnesium chloride was replaced by the same amount of calcium chloride. The porosity increasing effect was very pronounced, although not quite as great as it was with the magnesium salt. In Example 6, which also corresponds to Example 1, barium chloride was used instead of magnesium chloride. The results were identical to those of Example 5.

Example 7

The inventive emulsifiers are also active in the suspension polymerization system in complete absence of conventional protective colloids, such as cellulose ether. Thus, even in the absence of such colloids, the polymerization proceeds in such a manner that a uniformly granular porous PVC is formed. This is demonstrated by the following test:

A glass-lined pressure vessel or autoclave with a horseshoe-shaped stirrer was charged with:

3000 parts of desalted water;
15 parts of an ammonium stearylalcohol-polyglycol ether carboxylic acid solution of 10% concentration ($x=2$, $n=16$);
1 part of ammonia (13 n.); and 1.5 parts of a dialkylperoxydicarbonate initiator, as well as 1.5 parts of MgCl$_2$·6H$_2$O.

The charge was heated to 30° C.

After removal of the oxygen in the manner described in Example 1, 1500 parts of vinyl chloride were forced into the pressure vessel, and the mixture was heated under intensive agitation to 53° C. Upon completed reaction, a polymer with grains of 1-2 mm. diameter was obtained which rapidly accepted softeners. Foils, rolled from the product, exhibited an exceptional brilliance and gloss due to the absence of incompatible cellulose ethers.

What is claimed is:

1. In a process of producing vinyl chloride homopolymers and copolymers of porous grain structure, wherein vinyl chloride monomer or vinyl chloride monomer in admixture with other ethylenically unsaturated monomers is suspension-polymerized in the presence of an emulsifier, the improvement which comprises that the emulsifier is of organophilic nature and is a water-insoluble metal salt of a fatty alcohol polyglycol ether carboxylic acid of the formula $$\text{Me}-[\text{OOCCH}_2\text{O}(\text{CH}_2\text{CH}_2\text{O})_x(\text{CH}_2)_n\text{CH}_3]_m$$

wherein

Me is at least one of the metals Mg, Ca, Ba, Cd, Zn, Al, Pb or Sn;

$m$ is dependence on the valence of the metal, stands for 2, 3 or 4;

$x$ is a number of from 0 to 20; and $n$ is a number of from 6 to 20, said emulsifier being contained in the suspension-polymerization system in the amount of between about 0.01‰–1%, calculated on the amount of monomers.

2. The improvement of claim 1, wherein the emulsifier is formed in situ in the reactor in which the suspension polymerization is carried out by reacting a water-soluble alkali metal salt or ammonium salt of the corresponding fatty alcohol polyglycol ether carboxylic acid and a water-soluble Me-salt.

3. The improvement of claim 1, wherein the emulsifier is formed by reacting a water-soluble alkali metal salt or ammonium salt of at least two different fatty alcohol polyglycol ether carboxylic acids and a water-soluble Me-salt.

4. The improvement of claim 1, wherein the emulsifier is formed by reacting a water-soluble alkali metal salt or ammonium salt of at least two different fatty alcohol polyglycol carboxylic acids whose fatty alcohol and polyglycol ether groups have different carbon chain lengths and a water-soluble Me-salt.

5. The improvement of claim 1, wherein the emulsifier is composed of a mixture of emulsifiers, wherein the Me of each emulsifier stands for a different metal.

References Cited
UNITED STATES PATENTS

| | | | |
|---|---|---|---|
| 3,311,579 | 3/1967 | Donat | 260—23 |
| 3,321,425 | 5/1967 | Blau | 260—23 |
| 3,488,328 | 1/1970 | Koyanagi | 260—78.5 |

JOSEPH L. SCHOFER, Primary Examiner

R. S. BENJAMIN, Assistant Examiner

U.S. Cl. X.R.

260—86.3, 87.5 RG, 87.7